United States Patent
Jones

(10) Patent No.: US 10,418,648 B2
(45) Date of Patent: *Sep. 17, 2019

(54) METHOD FOR PRODUCING BIPOLAR PLATES

(71) Applicant: ENERGYOR TECHNOLOGIES INC., Saint-Laurent (CA)

(72) Inventor: Thomas Jones, Montreal (CA)

(*) Notice: Subject to any disclaimer, the term of this patent is extended or adjusted under 35 U.S.C. 154(b) by 484 days.

This patent is subject to a terminal disclaimer.

(21) Appl. No.: 15/155,389

(22) Filed: May 16, 2016

(65) Prior Publication Data

US 2017/0133692 A1    May 11, 2017

Related U.S. Application Data

(63) Continuation of application No. 12/816,609, filed on Jun. 16, 2010, now Pat. No. 8,470,489.

(60) Provisional application No. 61/334,379, filed on May 13, 2010.

(51) Int. Cl.

| | |
|---|---|
| *H01M 8/0258* | (2016.01) |
| *H01M 8/2483* | (2016.01) |
| *H01M 8/0273* | (2016.01) |
| *B26F 1/38* | (2006.01) |
| *B26F 1/40* | (2006.01) |
| *H01M 8/0213* | (2016.01) |
| *H01M 8/0247* | (2016.01) |
| *H01M 8/0267* | (2016.01) |
| *H01M 8/0202* | (2016.01) |
| *H01M 8/026* | (2016.01) |
| *H01M 8/1011* | (2016.01) |
| *H01M 8/248* | (2016.01) |

(52) U.S. Cl.
CPC .......... *H01M 8/0258* (2013.01); *B26F 1/384* (2013.01); *B26F 1/40* (2013.01); *H01M 8/0202* (2013.01); *H01M 8/0213* (2013.01); *H01M 8/0247* (2013.01); *H01M 8/0267* (2013.01); *H01M 8/0273* (2013.01); *H01M 8/2483* (2016.02); *H01M 8/026* (2013.01); *H01M 8/1011* (2013.01); *H01M 8/1013* (2013.01); *H01M 8/248* (2013.01); *Y02E 60/522* (2013.01); *Y02E 60/523* (2013.01); *Y10T 83/0524* (2015.04)

(58) Field of Classification Search
None
See application file for complete search history.

(56) References Cited

U.S. PATENT DOCUMENTS

| | | |
|---|---|---|
| 762,070 A | 6/1904 | Longard |
| 5,521,018 A | 5/1996 | Wilkinson et al. |
| 5,527,363 A | 6/1996 | Wilkinson et al. |
| 5,683,828 A | 11/1997 | Spear et al. |
| 5,976,726 A | 11/1999 | Wilkinson et al. |
| 5,981,098 A | 11/1999 | Vitale |
| 6,436,568 B1 | 8/2002 | Schilling et al. |
| 6,547,229 B1 * | 4/2003 | Hanson ............... B65H 29/243 156/230 |
| 6,604,457 B2 | 8/2003 | Klug |
| 6,649,102 B2 | 11/2003 | Davis et al. |

(Continued)

*Primary Examiner* — Nathan T Leong

(57) ABSTRACT

A method for producing bipolar plates includes removing scrap material from an electrically conductive plate. The scrap material is created when the plate is cut through to produce a fluid flow opening therein and in which an inlet manifold opening and an outlet manifold opening are located at the ends of the fluid flow opening and in communication therewith.

25 Claims, 9 Drawing Sheets

(56) References Cited

U.S. PATENT DOCUMENTS

| | | |
|---|---|---|
| 6,663,807 B2 | 12/2003 | Klug |
| 6,677,071 B2 | 1/2004 | Yang |
| 6,706,437 B2 | 3/2004 | Trap et al. |
| 6,716,381 B2 | 4/2004 | Klug |
| 6,749,959 B2 | 6/2004 | Nakata et al. |
| 6,797,091 B2 | 9/2004 | Lines et al. |
| 6,818,165 B2 | 11/2004 | Gallagher |
| 6,827,747 B2 | 12/2004 | Lisi et al. |
| 6,893,770 B2 | 5/2005 | Rock |
| 7,004,311 B2 | 8/2006 | Mercuri |
| 7,144,648 B2 | 12/2006 | Tawfik et al. |
| 7,150,846 B2 | 12/2006 | Bartholomeyzik et al. |
| 7,182,898 B2 | 2/2007 | Klug |
| 7,220,512 B2 | 5/2007 | Ohara et al. |
| 7,285,353 B2 | 10/2007 | Lisi et al. |
| 7,306,875 B2 | 11/2007 | Garceau |
| 7,335,438 B2 | 2/2008 | Lee et al. |
| 7,341,781 B2 | 3/2008 | Klug |
| 7,374,838 B2 | 5/2008 | Gallagher |
| 7,381,493 B2 | 6/2008 | Ishikawa et al. |
| 7,405,017 B2 | 7/2008 | Strobel et al. |
| 7,419,739 B2 | 9/2008 | Lai |
| 7,459,227 B2 | 12/2008 | Rock et al. |
| 7,468,216 B2 | 12/2008 | Hammerschmidt |
| 7,494,738 B2 | 2/2009 | Terazawa et al. |
| 7,510,678 B2 | 3/2009 | Kim et al. |
| 7,595,126 B2 | 9/2009 | Wells et al. |
| 7,604,888 B2 | 10/2009 | Rock et al. |
| 7,635,532 B2 | 12/2009 | Hase et al. |
| 7,655,341 B2 | 2/2010 | Strobel et al. |
| 7,704,624 B2 | 4/2010 | Jiang et al. |
| 8,003,279 B2 | 8/2011 | Budinski |
| 9,667,696 B2 | 5/2017 | Hu et al. |
| 2002/0180093 A1* | 12/2002 | Reynolds, III ........ C04B 35/536 264/115 |
| 2003/0160357 A1* | 8/2003 | Gallagher ........... H01M 8/0213 264/173.1 |
| 2004/0142226 A1 | 7/2004 | Yamauchi et al. |
| 2008/0220282 A1* | 9/2008 | Jang ........................ B32B 15/08 428/689 |

* cited by examiner

METHOD FOR PRODUCING BIPOLAR PLATES

CROSS-REFERENCE TO RELATED APPLICATIONS

This application is a continuation of U.S. patent application Ser. No. 13/898,901, filed on May 21, 2013, which is a continuation of U.S. patent application Ser. No. 12/816,609, filed on Jun. 16, 2010 (now U.S. Pat. No. 8,470,489), which claims the benefit of the filing date of U.S. Provisional Patent Application No. 61/334,379 filed May 13, 2010, the disclosures of which are hereby incorporated herein by reference.

BACKGROUND OF THE INVENTION

The present generally concerns electrochemical fuel cells and more particularly to a method for fabricating bipolar plates.

Polymer electrolyte membrane or proton exchange membrane (PEM) fuel cells have intrinsic benefits and a wide range of applications due to their relatively low operating temperatures (room temperature to around 80° C., and up to 160° C. with high temperature membranes). The active portion of a PEM is a membrane sandwiched between an anode and a cathode layer. Fuel containing hydrogen is passed over the anode and oxygen (air) is passed over the cathode. The reactants, through the electrolyte (the membrane), react indirectly with each other generating an electrical voltage between the cathode and anode. Typical electrical potentials of PEM cells can range from 0.5 to 0.9 volts; the higher the voltage the greater the electrochemical efficiency. However, at lower cell voltages, the current density is higher but there is eventually a peak value in power density for a given set of operating conditions. The electrochemical reaction also generates heat and water as byproducts that must be extracted from the fuel cell, although the extracted heat can be used in a cogeneration mode, and the product water can be used for humidification of the membrane, cell cooling or dispersed to the environment.

Multiple cells are combined by stacking, interconnecting individual cells in electrical series. The voltage generated by the cell stack is effectively the sum of the individual cell voltages. There are designs that use multiple cells in parallel or in a combination series parallel connection. Separator plates (bipolar plates) are inserted between the cells to separate the anode reactant of one cell from the cathode reactant of the next cell. These separator plates are typically graphite based or metallic (with or without coating). To provide hydrogen to the anode and oxygen to the cathode without mixing, a system of fluid distribution and seals is required.

The dominant design at present in the fuel cell industry is to use fluid flow field plates with the flow fields machined, molded or otherwise impressed in the bipolar plates. An optimized bipolar plate has to fulfill a series of requirements: very good electrical and heat conductivity; gas tightness; corrosion resistance; low weight; and low cost. The bipolar plate design ensures good fluid distribution as well as the removal of product water and heat generated. Manifold design is also critical to uniformly distribute fluids between each separator/flow field plate.

There is an ongoing effort to innovate in order to increase the power density (reduce weight and volume) of fuel cell stacks, and to reduce material and assembly costs.

In a fuel cell system (stack & balance of plant), the stack is the dominant component of the fuel cell system weight and cost and the bipolar plates are the major component (both weight and volume) of the stack.

Bipolar plates are a significant factor in determining the gravimetric and volumetric power density of a fuel cell, typically accounting for 40 to 70% of the weight of a stack and almost all of the volume. For component developers, the challenge is therefore to reduce the weight, size and cost of the bipolar plate while maintaining the desired properties for high-performance operation.

The multiple roles of the bipolar plate and the challenging environment in which it operates means that the material from which it is made must possess a particular set of properties. The material should combine the following characteristics:

High electrical conductivity, especially in the through-plane direction;

Low contact resistance with the gas diffusion layer (GDL)—depending on the plate material and the thickness, the contact resistance with the GDL can be more important than the resistance of the plate itself;

Good thermal conductivity—efficient removal of heat from the electrodes is vital for maintaining an even temperature distribution;

Thermal Stability;

Gas impermeability to avoid potentially dangerous and performance-degrading leaks;

Good mechanical strength—so as to be physically robust and to support the MEA;

Corrosion resistance—bipolar plates operate in a warm, damp environment while simultaneously exposed to air and fuel over a range of electrical potentials (ideal conditions for corrosion to occur);

Resistance to ion-leaching—if metal ions are released from the plate they can displace protons in the membrane and lower the ionic conductivity;

Thin and lightweight while accommodating the flow channels and maintaining mechanical stability;

Low cost and ease of manufacturing;

Environmentally benign;

Recyclable.

A number of different methods have been used to manufacture bipolar plates including for example, U.S. Pat. No. 6,818,165 to Gallagher for "Method of Fabricating Fluid Flow Field Plates" on Nov. 16, 2004 and U.S. Pat. No. 6,997,696 to Davis et al for "Apparatus for Cutting Expanded Graphite Sheet Material" on Feb. 14, 2006. These methods, however, have a number of significant drawbacks. For example, the fabrication fluid flow field plates require four steps, namely roller embossing fluid flow channels; reciprocally embossing fluid distribution areas; die cutting manifold openings; and curing the plates in an autoclave. The methods used to roller emboss flow channels, reciprocally emboss fluid distribution manifolds, and then die cut the manifold openings requires careful alignment of the part between each of these steps. Additionally, four embossing dies and one cutting die per part are required, i.e., two mating roller dies, two mating reciprocal dies, and one cutting die to cut the manifolds. The methods use "pre-impregnated" expanded graphite which must be cured after part fabrication in an autoclave to improve the mechanical properties of the fluid flow field plate. The fluid distribution areas are not "straight" and therefore the roller is unable to emboss the entire part in one step.

Thus, there is a need for an improved method for fabricating bipolar plates.

BRIEF SUMMARY OF THE INVENTION

We have designed a low cost method for producing lightweight bipolar plates. The method involves cutting through a sheet of flexible graphite and then finishing the cut sheet. Unlike the examples described above, our method requires only die cutting flow channels and manifolds, and finishing the part by pressing. Our method cuts all flow channels and manifolds in one step and the "finishing" step does not require careful part alignment. Furthermore, our method only requires one cutting die per part. The post cutting treatment is eliminated and since our method of fluid distribution is effectively straight, we are able to cut all features in one step with a rotary flexible die.

Accordingly, there is provided a method for producing bipolar plates, the method comprising providing an electrically conductive sheet; and cutting through the sheet to create therein at least one opening for a fluid.

The method, as described above, further comprising finishing the cut sheet by pressing it between two rigid, flat plates.

In one example, the rigid, flat plates each include a non-stick coating.

The method, as described above, further comprising finishing the cut sheet by pressing it between two parallel rollers.

In one example, the parallel rollers each include a non-stick coating.

In another example, the cutting step is carried out using a die having at least one blade. The die has two blades. The die is a rule die or a flexible die. The two blades of the die are located side-by-side.

In another example, the cut plate includes at least one elongate oxidant flow opening. The cut plate includes a plurality of elongate parallel oxidant flow openings. At least one oxidant inlet manifold opening and at least one oxidant outlet manifold opening located at the ends of the elongate oxidant flow openings and in communication therewith.

In another example, the cut plate includes at least one fuel inlet manifold opening and at least one fuel outlet manifold opening.

In another example, the cut plate includes at least one elongate fuel flow opening. The cut plate includes a plurality of elongate parallel fuel flow openings. The cut plate includes at least one fuel inlet manifold opening and at least one fuel outlet manifold opening which are located away and separate from the elongate parallel fuel flow openings. The cut plate includes at least one fuel inlet manifold opening and at least one fuel outlet manifold opening located at the ends of the elongate fuel flow openings and in communication therewith. The openings carry a coolant and fuel combination. The coolant and fuel combination is an alcohol. The alcohol is methanol or ethanol. The alcohol is methanol.

In one example, the cut plate is an oxidant flow field plate.

In another example, the cut plate is a fuel flow field plate.

In another example, the cut plate includes a plurality of oxidant inlet manifold openings and a plurality of oxidant outlet manifold openings.

In another example, the cut plate includes at least one fuel inlet manifold opening and at least one fuel outlet manifold opening.

In yet another example, the cut plate is a separator plate. The separator plate is a cooling fin separator plate.

In one example, the electrically conductive sheet is flexible graphite.

According to another aspect, there is provided a method of producing a fuel cell stack, the method comprising: providing a Membrane Electrode Assembly (MEA) having an anode, a cathode and an electrolyte located therebetween; locating an oxidant flow field plate against the cathode; locating a fuel flow field plate against the anode; locating a separator plate against the oxidant flow field plate; compressing the plates to produce the fuel cell stack, each of the plates each having been cut through to create a plurality of openings therein and finished, the plates being made from an electrically conductive material.

In one example, the step of compressing the plates creates a plurality of oxidant flow channels between the oxidant flow field plate and the cathode, and a plurality of fuel flow channels between the fuel flow field plate and the anode. The compressed plates are self-sealed.

In one example, the plates are made from flexible graphite.

In one example, in which prior to the compressing step, a gasket is bonded to each of the oxidant fuel field plate and the fuel flow field plate.

In another aspect, there is provided a stacked fuel cell assembly, comprising: a Membrane Electrode Assembly (MEA) having a cathode and an anode, and an electrolyte located therebetween; an oxidant flow field plate having a plurality of openings cut therethrough, the oxidant flow field plate being located in intimate contact with the cathode so that the openings define a plurality of oxidant flow channels and a first plurality of manifolds; a fuel flow field plate having a openings cut therethrough, the fuel flow field plate being located in intimate contact with the anode so that the openings define a plurality of fuel flow channels and a second plurality of manifolds; and a separator plate located in intimate contact with the oxidant flow field plate, the separator plate having a plurality of openings cut therethrough.

In one example, the channels are trapezoidal in cross section.

In one example, the plates are made from an electrically conductive material. The material is flexible graphite.

BRIEF DESCRIPTION OF THE DRAWINGS

These and other features of that described herein will become more apparent from the following description in which reference is made to the appended drawings wherein.

DETAILED DESCRIPTION

Definitions

Unless otherwise specified, the following definitions apply:

The singular forms "a", "an" and "the" include corresponding plural references unless the context clearly dictates otherwise.

As used herein, the term "comprising" is intended to mean that the list of elements following the word "comprising" are required or mandatory but that other elements are optional and may or may not be present.

As used herein, the term "consisting of" is intended to mean including and limited to whatever follows the phrase "consisting of". Thus, the phrase "consisting of" indicates that the listed elements are required or mandatory and that no other elements may be present.

As used herein, the term "flow field plate" is intended to mean a plate that is made from a suitable electrically conductive material. The material is typically substantially fluid impermeable, that is, it is impermeable to the reactants and coolants typically found in fuel cell applications, and to fluidly isolate the fuel, oxidant, and coolants from each other. In the examples described below, an oxidant flow field plate is one that carries oxidant, whereas a fuel flow field plate is one that carries fuel. The flow field plates can be made of the following materials graphitic carbon impregnated with a resin or subject to pyrolytic impregnation; flexible graphite; metallic material such as stainless steel, aluminum, nickel alloy, or titanium alloy; carbon-carbon composites; carbon-polymer composites; or the like. Flexible graphite, also known as expanded graphite, is one example of a suitable material that is compressible and, for the purposes of this discovery, easily cut through.

As used herein, the term "fluid" is intended to mean liquid or gas. In particular, the term fluid refers to the reactants and coolants typically used in fuel cell applications.

Figure 1:
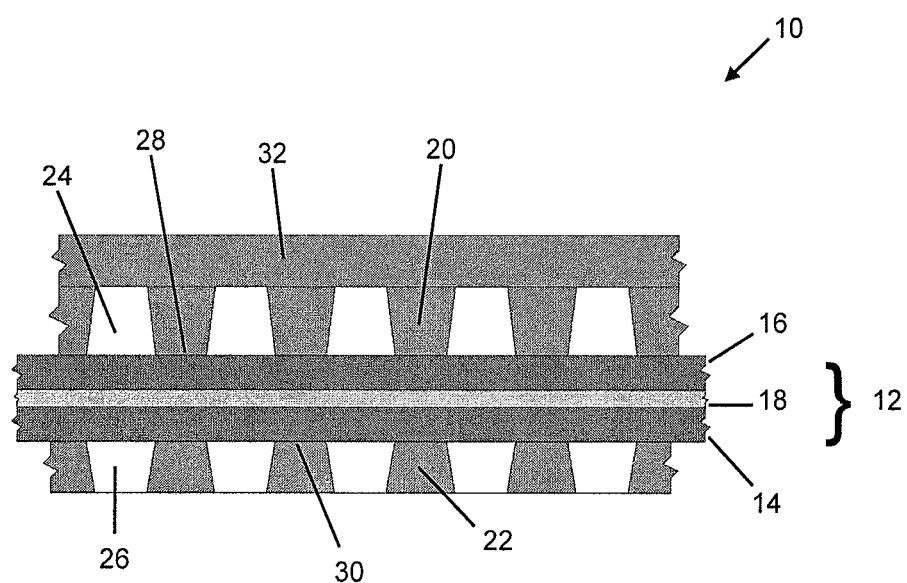
FIG. 1 is a cross-sectional view of unit cell assembly.

Referring now to FIG. 1 in which a repeating unit cell assembly of a fuel cell stack is shown generally at 10. The fuel cell 10 comprises a Membrane Electrode Assembly (MEA) 12, which includes an anode 14, a cathode 16 and a solid electrolyte 18 located between the anode 14 and the cathode 16. The MEA 12 is located between an oxidant flow field plate 20 and a fuel flow field plate 22. A first plurality of oxidant flow channels 24 are located between the oxidant field flow plate 20 and the cathode 16 to supply the oxidant to the cathode 16. A second plurality of fuel flow channels 26 are located between the fuel flow field plate 22 and the anode 14 to supply fuel to the anode 14. A plurality of oxidant channel landings 28 are located on one side of the oxidant flow field plate 20, and fuel channel landings 30 are located on one side of the fuel flow field plate 22 and respectively intimately contact the cathode 16 and the anode 14 to allow the passage of electrical current and heat from the MEA 12. A separator plate 32 is located in intimate contact with the oxidant fuel field plate 20 and allows the axial passage of electrical current therealong. In the example illustrated, the separator plate 32 is a cooling fin separator plate which also laterally transfers heat to external cooling fins and acts as a separator between each repeating unit cell. Typically, when multiple cell are assembled, each fuel flow field plate 22 lies in intimate contact with a cooling fin separator plate 32, thereby sealing the channels 26.

Figure 2:
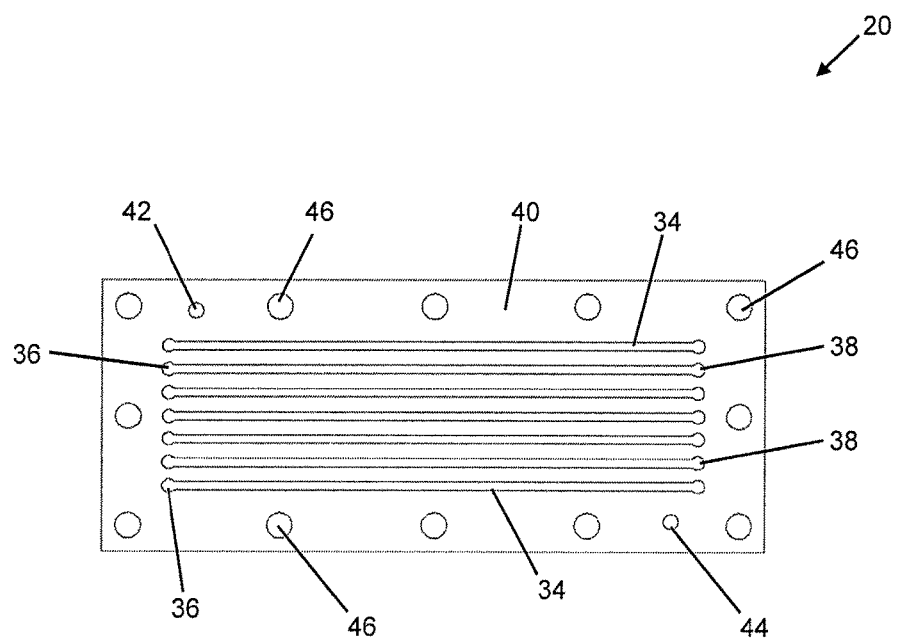
FIG. 2 is a top view of an oxidant flow field plate.

Referring now to FIG. 2, an individual oxidant flow field plate 20 is shown and includes at least one elongate oxidant flow channel 34. In the example shown, a plurality of elongate parallel oxidant flow openings 34 are cut through the plate 20 and extend parallel to each other along the central portion of the plate 20. Each elongate oxidant flow opening includes an oxidant inlet manifold opening 36 and an oxidant outlet manifold opening 38, which are located at each end of the elongate oxidant flow opening 34. The oxidant flow field plate 20 also includes a peripheral area 40, which forms a boundary around the elongate oxidant flow openings 34. A fuel inlet manifold opening 42 and a fuel outlet manifold opening 44 are cut through the peripheral area 40 and are located away from each other on opposite sides of the oxidant flow openings 34. A plurality of holes 46 to accommodate a stack compression system are also cut through the peripheral area 40, as will be explained below Referring now to FIG. 3, an individual fuel flow field plate 22 is shown and includes at least one elongate fuel flow opening 48. In the example illustrated, a plurality of elongate parallel fuel flow openings 48 are cut through the plate 22 and extend parallel to each other along the central portion of the plate 22. The plate 22 includes a peripheral area 50, which forms a boundary around the elongate fuel flow openings 48. A plurality of oxidant inlet manifold openings 52 are located away from one end of the elongate fuel flow openings 48 and a plurality of oxidant outlet manifold openings 54 are located away from the other end of the elongate fuel flow openings 48. Each of openings 52 and 54 is individually cut through the plate 22 and form discrete openings and are not connected to the elongate fuel flow openings 48. A fuel inlet manifold opening 56 and a fuel outlet manifold opening 58 are cut through the peripheral area 50 and are located away from each other on opposite sides of the fuel flow openings 48. Fuel inlet manifold opening 56 is connected to fuel flow openings 48 via a slit in an adjacent polyethylene terephthalate (PET) gasket system which partially covers peripheral area 50, which will be described below. Similarly, fuel outlet manifold opening 58 is connected to fuel flow openings 48 in the same manner. A plurality of holes 60 to accommodate a stack compression system is also cut through the peripheral area 50, as will be explained below. In one example, the openings 48 can carry a coolant and fuel combination, which is an alcohol. In one example, the alcohol is either ethanol or methanol, although methanol is typically used.

Figure 4:
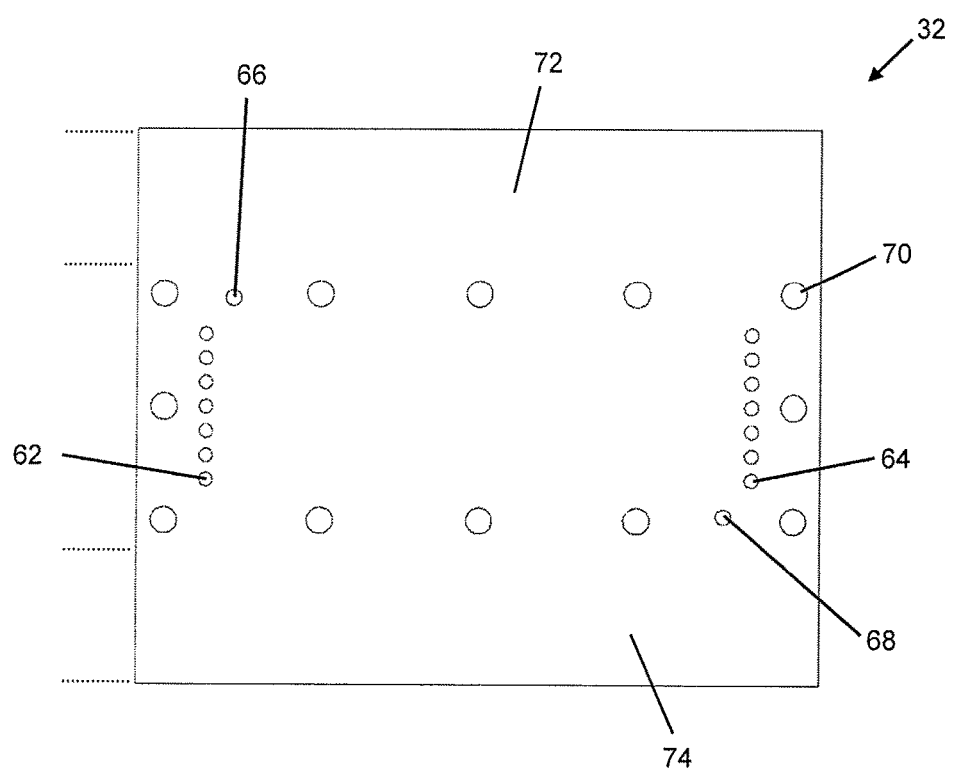
FIG. 4 is a top view of a cooling fin separator plate.

Referring now to FIG. 4, an individual cooling fin separator plate 32 is shown and includes a plurality of oxidant inlet manifold openings 62 and a plurality of oxidant outlet manifold openings 64 which are located away from the openings 62 at opposite ends of the plate 32 and are cut through the plate 32. A fuel inlet manifold opening 66 and a fuel outlet manifold opening 68 are cut through the plate 32 and are located away from each other. A plurality of holes 70 to accommodate a stack compression system is also cut through the plate 32, as will be explained below. Two cooling fin areas 72, 74 are located on either side of the openings 62, 64, 66, and 68 and holes 70.

Figure 5:
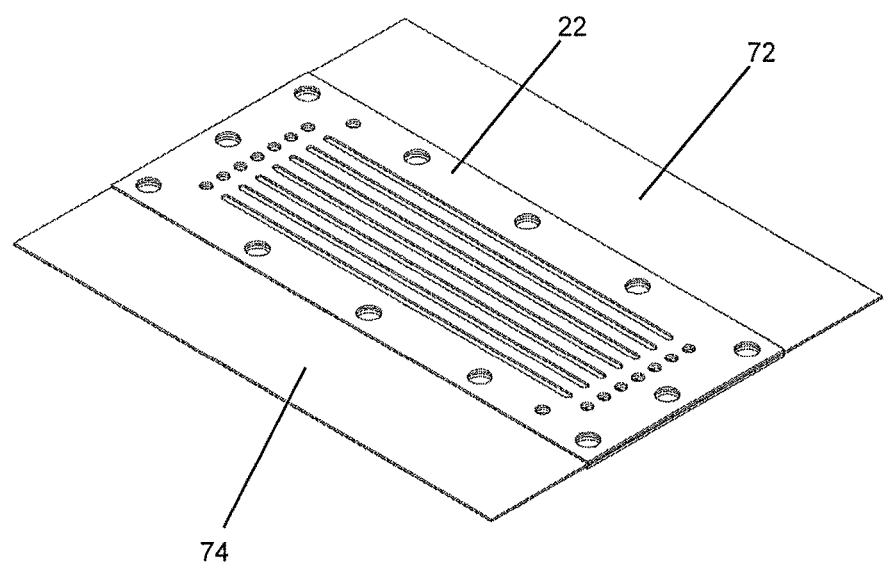
FIG. 5 is a perspective top view of a bipolar plate assembly.
Figure 6:
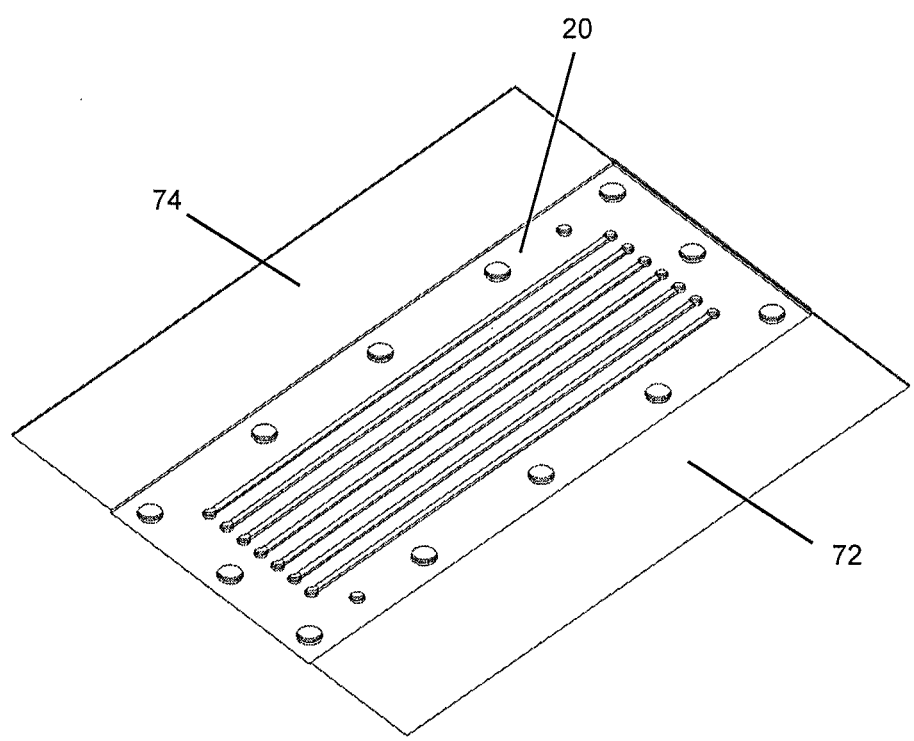
FIG. 6 is a perspective worm's eye view of a bipolar plate assembly.

Referring now to FIGS. 1, 5 and 6, when the plates 20, 22 and 32 are assembled, the elongate oxidant and fuel flow field openings 34, 48 are aligned to create the oxidant flow channels 24 and the fuel flow channels 26. The cooling fin areas 72, 74 extend away from the plates 20, 22 along substantially the entire length of the plates 20, 22. In the example shown, the manifold openings 36, 38, 42, and 44 align with the corresponding manifold openings in the cooling fin separator plate 32. One of the advantages of using flexible graphite plates to manufacture the fuel cell stacks is that they are self-sealing when compressed together to form the stack. This eliminates the need for bonding using adhesives during the assembly of the plates.

Figure 3:
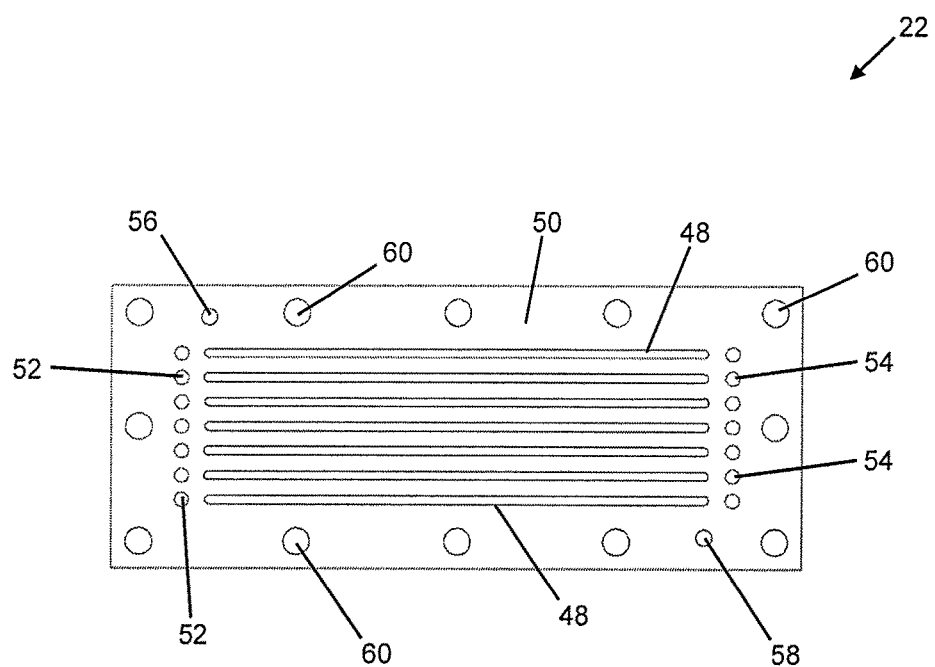
FIG. 3 is a top view of a fuel flow field plate.
Figure 7:
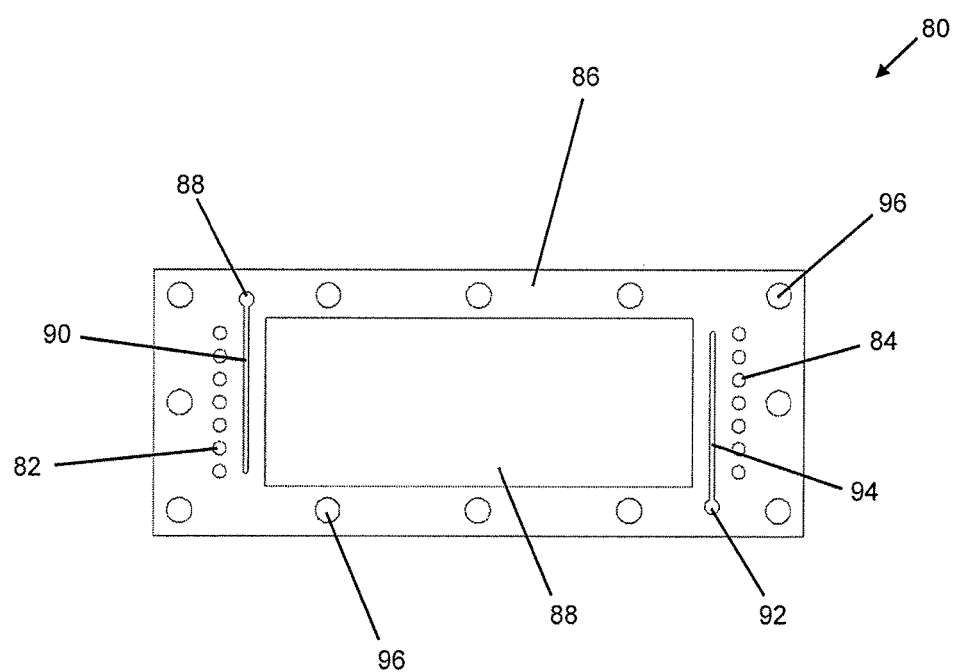
FIG. 7 is a top view of a fuel flow field plate gasket.
Figure 8:
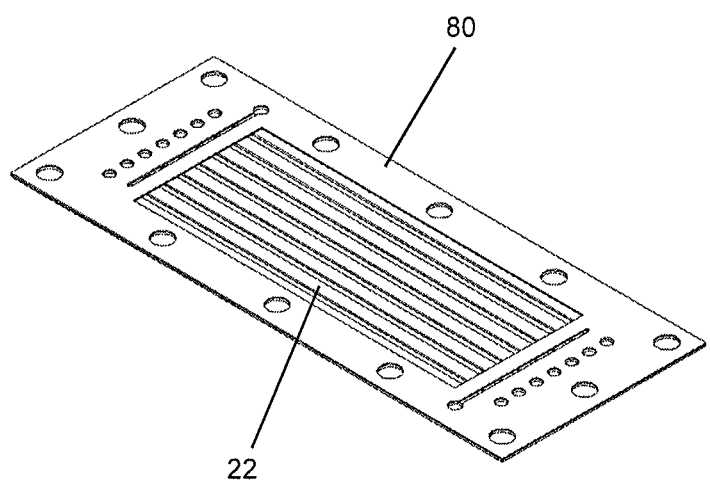
FIG. 8 is a perspective top view of the fuel flow field plate and fuel flow field plate gasket assembly.

Referring now to FIGS. 3, 7 and 8, when plate 22 is assembled to a PET gasket system 80, the manifold openings 52, 54, 56 and 58 align with manifold openings 82, 84, 88 and 92, respectively. Fuel from fuel inlet manifold 56 travels though fuel inlet manifold 88, and down slit manifold 90 made in the PET gasket. Fuel then passes down fuel flow field channels 48, reacting with active area 88, to slit manifold 94 and then exiting from fuel outlet manifold 92. A similar gasket system is also applied to cathode flow field plate 20, although the slit manifolds 90 and 94 are omitted.

Figure 9:
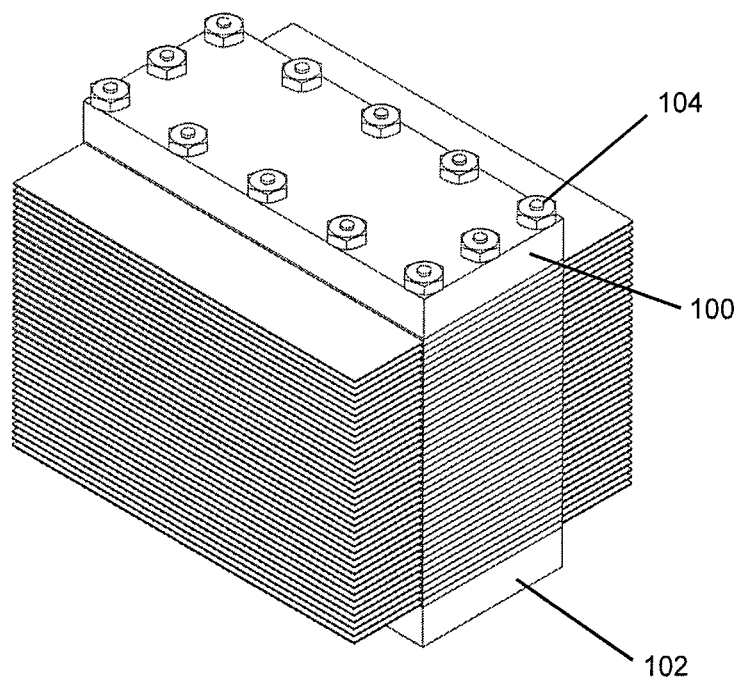
FIG. 9 is a perspective top view of the fuel cell stack assembly.

Referring now to FIGS. 1 and 9, where unit cells 10 are stacked between anode end plate 102 and cathode end plate 100, compressed, and fastened with compression system 104, which typically includes fasteners such as a nuts and threaded studs.

The fuel cell stacks described herein are particularly well suited for use in fuel cell systems for unmanned aerial vehicle (UAV) applications, which require very lightweight fuel cell systems with high energy density. Other uses for the fuel cell stacks include auxiliary power units (APUs) and small mobile applications such as scooters, which also require lightweight systems. Indeed, the fuel cell stacks may be useful in many other fuel cell applications such as automotive, stationary and portable power.

Manufacturing Process—Prototype Level

Flexible graphite is used to produce the fuel flow field plate 22, the oxidant flow field plate 20 and the cooling fin separator plate 32 and can be purchased in roll form.

Flexible dies or rule dies used in the cutting process, available from many die manufacturers, are typically used for label cutting applications and generally can cut hundreds of thousands of plates. The flexible die design is dependent on feature geometry and material thickness. The cutting step is typically carried out using a die having at least one blade, which cuts through the flexible graphite sheet and pushes the scrap away from the opening. In one example, the die has two blades located side-by-side and which cut through the sheet such that the scrap is removed from the sheet as a single piece.

Typically, for the fuel flow field plate 22, a 0.015" thick sheet is used.

Typically, for the cooling fin separator plate 32, a 0.015" thick sheet is used.

Typically, for the oxidant flow field plate 20, a 0.020" thick sheet is used.

Cutting

The fuel flow field plate 22, the oxidant flow field plate 20 and the cooling fin separator plate 32 are individually cut through using their respective flat, flexible dies using a manual, reciprocal hydraulic press.

The press cutting force varies from 6000 lbs to 11,000 lbs, which is monitored with a pressure gauge, and which depends on the number and spacing of die features. Thus, a tightly packed die with many features requires a greater cutting force.

Once cut through, the plates 20, 22 and 32 are removed from the die with suboptimal feature definition, part deformation and jagged edges where the die cutter penetrated the flexible graphite material. The scrap material that is removed during the cutting can be recycled. The dies are selected such that they cut the specific flow openings and manifold openings in the plates, as illustrated in FIGS. 2, 3 and 4.

Finishing

After cutting through, each plate is then pressed between two flat, rigid, parallel plates in the same manual hydraulic press to improve feature tolerance, eliminate undesired deformation caused by the die, and to "flatten" rough, jagged edges left by the cutting process.

A thin layer of Teflon is the applied to the pressing fixture on either side of the plates to improve surface finish and to eliminate "sticking" The cut through plates 20, 22 and 32 are then ready for stack assembly.

Manufacturing Process—Production Level

For higher volume manufacturing, rotary die cutting is used for increased throughput. Rotary flexible dies are available from many die manufacturers. Cylindrical flexible dies are mounted on a magnetic cylinder and mate with a cylindrical anvil, where all three dies can use the same magnetic cylinder to reduce cost. Rotary die cutting equipment for the label making industry is used.

Flexible graphite material (available in rolls) is automatically fed into the equipment. Typically, 3000 plates per hour are potentially possible using this manufacturing method.

Cutting

The fuel flow field plate 22, the oxidant flow field plate 20 and the cooling fin separator plate 32 are individually cut through using their respective rotary, flexible dies using rotary die cutting equipment. The distance between the rotary die and anvil is adjusted to achieve optimal part cutting. An automated scrap removal system removes residual flexible graphite for recycling.

A plate handling system, typically a conveyor, groups and transports the cut through plates to the "finishing" area.

Finishing

Each cut through plate is automatically fed into a rotary flattening system which comprises of two parallel rollers with Teflon coating and adjustable spacing. The finished plates are automatically removed from the rollers via conveyor and transported to their respective part bins. The plates are then ready for stack assembly.

Stack Assembly

After the three plates 20, 22, and 32 of the bipolar plate are "finished", a perimeter gasket made of PET is bonded to the oxidant flow field plate 20 and fuel flow field plate 22. The gasket mates to either side of the MEA 12 and provides a gas tight seal. As described above, the PET gasket bonded to the anode flow field plate incorporates a slit manifold 90 which routes fuel from the fuel inlet manifold 56, to fuel flow openings 48, and from fuel flow openings 48, along slit manifold 94, and out fuel outlet manifold 92. The stack is assembled one plate at a time beginning with anode end plate 102. The anode flow field plate 22 is placed first (with the PET gasket attached), the MEA 12 is then added, and then the oxidant flow field plate 20 (with the gasket attached). The next step is to add the cooling fin separator plate 32. This set of steps is repeated a plurality of times to build a stack. The last step is to add cathode end plate 100. This assembly is then compressed in a fixture and a compression system 104 holds the compressed stack together. Threaded rod studs pass through the holes for stack compression 46, 60, and 70, which are then fastened with a nut at the other end.

Since material is cut away from the bipolar plate, the fluid flow channels and manifolds are designed in such a way so that they are supported around their perimeter. Straight, parallel fluid flow channels and round manifolds are especially suited for this approach; serpentine flow channels which are sometimes used in fuel cells are not as suitable, although supporting tabs can be added where the tabs are embossed in a second manufacturing step.

For each plate, all features are cut simultaneously (channels and manifolds). It is possible to sequentially cut the plate features, but an additional die and alignment jig is required, which adds fabrication time and increases cost.

Alternatives

A unitary body would be fabricated using the method as described above, but would then be mechanically or adhesively bonded together by pressing force, or using silicone adhesive, respectively; this would create a bipolar plate.

A "hydrid" laminate structure is also contemplated which may include flexible graphite fluid flow channels, and an aluminum cooling fin. These subcomponents could also be mechanically or adhesively bonded together to create one part. In this case, the adhesive would not be applied to the active area portion of the bipolar plate because it is not electrically conductive.

An alternative approach would be would be to assemble the entire unit cell, as illustrated in FIG. 1, using adhesive as opposed to assembling the bipolar plate. In this case, the MEA 12 would be adhesively bonded to the plates 20 and 22, and then the cooling fin separator plate 32 would be bonded to the plate 20. This would allow testing on a unit cell level to confirm good performance and sealing characteristics prior to stack integration. The thickness of each plate and adhesive in the unit cell would need to be controlled so that good conductivity and sealing would be maintained.

Alternatively, a liquid cooling capacity is also contemplated in which the cooling fin separator plate is omitted and a liquid cooling section integrated in the stack. This design would require relocation of the manifolds to account for the additional fluid.

The "finishing" stage of the part fabrication could be used to increase the density of the flexible graphite and therefore improve mechanical and electrical properties (i.e. a 0.020" thick cut part could be pressed down to 0.015").

The anode flow field plate uses a "hybrid" manifold design, whereas the fluid link between the fuel manifold and anode flow field is achieved via an embossed feature in the cooling fin separator plate instead of the slit manifold in the PET gasket currently used, but this would add a fabrication step for this plate.

The plates can be fabricated with high volume manufacturing process (reciprocal or rotary die-cutting commonly used in label making) therefore reducing overall part cost;

Parts can be fabricated using very low cost tooling (flat or cylindrical flexible dies). Moreover, flexible graphite raw material is inexpensive and is available in various forms and thicknesses. Advantageously, seals are eliminated between layered bipolar plate components due to sealing nature of flexible graphite, which reduces part count and therefore overall cost. Flexible graphite has a typical density of 1.12 g/cc. Pure graphite typically used for machining bipolar plates has a density of approximately 2.0 g/cc (1.79 times more). Graphite used for molded bipolar plates can achieve a density as low as 1.35 g/cc (1.2 times more) but requires expensive injection molding equipment and cavity dies. Additionally, flexible graphite bipolar plates fabricated via die-cutting have reduced mass because material is removed for flow channels and manifolds as opposed to being embossed.

Fluid flow channel depth may be changed easily by changing thickness of flexible graphite sheet and using same die. Also, a modular bipolar plate allows for various fuel cell configurations, for example, if more cooling is required for a specific application, a larger air cooling fin can be substituted.

Modular bipolar plate also provides ability to preassemble unit cell for easier stack assembly. Testing can also be performed on this unit cell prior to stack assembly.

Modular bipolar plate also allows supplemental cooling channels for liquid cooling to be integrated between unit cell assemblies for other stack designs (i.e. fluid manifolds and flow channels would require redesign).

Resulting bipolar plate is very thin (i.e. 0.015"+0.015"+0.020"=0.050" thick) which reduces overall volume.

Cathode and anode fluid flow channels are perpendicular, reducing the complexity of fuel manifolding.

Cathode and anode fluid flow channels are perpendicular and integrated into a square stack design, thereby allowing the cathode flow field plate and anode flow field plate to be identical and cut with the same flexible die.

Cathode and anode fluid flow channels are perpendicular and integrated into a square stack design, thereby allowing the cathode flow field plate and anode flow field plate to be identical and cut with the same flexible die, where the channel opening size is adjusted via the material thickness.

Cathode and anode fluid flow channels are perpendicular and integrated into a square stack design, where the cooling fin separator plate does not incorporate cooling fins, where the cooling capacity is performed via a liquid fuel in the anode flow channels such as methanol for a Direct Methanol Fuel Cell (DMFC).

Other Embodiments

From the foregoing description, it will be apparent to one of ordinary skill in the art that variations and modifications may be made to the embodiments described herein to adapt it to various usages and conditions.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for producing bipolar plates, the method comprising:
    a) completely cutting through an electrically conductive plate to create at least one fluid flow opening therein and at least one a piece of scrap material, wherein at least one inlet manifold opening and at least one outlet manifold opening are located at the ends of the at least one fluid flow opening and in communication therewith; and
    b) removing the scrap material from the at least one fluid flow opening.

2. The method according to claim 1, further comprising finishing the cut sheet by pressing it between two rigid, flat plates.

3. The method according to claim 2, in which the rigid, flat plates each include a non-stick coating.

4. The method according to claim 1, further comprising finishing the cut sheet by pressing it between two parallel rollers.

5. The method according to claim 4, in which the parallel rollers each include a non-stick coating.

6. The method according to claim 1, in which the cutting step through is carried out using a die having at least one blade, which cuts through the sheet and pushes the scrap material away from the opening.

7. The method according to claim 1, in which the cutting step through is carried out using a die having two blades located side-by-side, which cut through the sheet such that the scrap material is removed from the sheet as a single piece.

8. The method according to claim 1, in which the scrap material is recycled.

9. The method according to claim 6, in which the die is a rule die or a flexible die.

10. The method according to claim 1, in which the cut plate includes a plurality of elongate parallel fuel flow openings.

11. The method according to claim 10, in which the cut plate includes at least one fuel inlet manifold opening and at least one fuel outlet manifold opening which are located away and separate from the elongate parallel fuel flow openings.

12. The method according to claim 1, in which the openings carry a coolant and fuel combination.

13. The method according to claim 12, in which the coolant and fuel combination is an alcohol.

14. The method according to claim 13, in which the alcohol is methanol or ethanol.

15. The method according to claim 1, in which the cut plate is a fuel flow field plate.

16. The method according to claim 1, in which the electrically conductive plate is flexible graphite.

17. The method according to claim 1, in which the cut plate includes at least one elongate oxidant flow opening.

18. The method according to claim 1, in which the cut plate includes a plurality of elongate parallel oxidant flow openings.

19. The method according to claim 1, in which at least one oxidant inlet manifold opening and at least one oxidant outlet manifold opening located at the ends of the elongate oxidant flow openings and in communication therewith.

20. The method according to claim 1, in which the cut plate includes at least one elongate fuel flow opening.

21. The method according to claim 1, in which the cut plate includes at least one fuel inlet manifold opening and at least one fuel outlet manifold opening located at the ends of the elongate fuel flow openings and in communication therewith.

22. The method according to claim 1, in which the cut plate is an oxidant flow field plate.

23. The method according to claim 1, in which the cut plate includes a plurality of oxidant inlet manifold openings and a plurality of oxidant outlet manifold openings.

24. The method according to claim 1, in which the cut plate is a separator plate.

25. The method according to claim 24, in which the separator plate is a cooling fin separator plate.

* * * * *